United States Patent
Nimz et al.

(10) Patent No.: US 6,822,352 B2
(45) Date of Patent: Nov. 23, 2004

(54) COOLING OF STATOR BY CORRUGATED HOSE IN AN ELECTRIC MACHINE

(75) Inventors: Detlef Nimz, Hoyerswerda (DE); Rudolf Meister, Schwanstetten (DE)

(73) Assignee: Baumüller Nürnberg GmbH, Nürnberg (DE)

( * ) Notice: Subject to any disclaimer, the term of this patent is extended or adjusted under 35 U.S.C. 154(b) by 0 days.

(21) Appl. No.: 10/466,844

(22) PCT Filed: Jan. 14, 2002

(86) PCT No.: PCT/DE02/00086
§ 371 (c)(1),
(2), (4) Date: Oct. 24, 2003

(87) PCT Pub. No.: WO02/060036
PCT Pub. Date: Aug. 1, 2002

(65) Prior Publication Data
US 2004/0130223 A1 Jul. 8, 2004

(30) Foreign Application Priority Data
Jan. 25, 2001 (DE) .......................... 101 03 447

(51) Int. Cl.[7] ................................. H02K 9/00
(52) U.S. Cl. ........................ 310/58; 310/54; 310/64; 310/16
(58) Field of Search ...................... 310/58, 64, 54, 310/16; 29/596

(56) References Cited

U.S. PATENT DOCUMENTS

| 2,217,430 | A | * | 10/1940 | Baudry | 310/54 |
| 2,386,701 | A | * | 10/1945 | Martin | 310/93 |
| 2,898,484 | A | * | 8/1959 | Krastchew | 310/52 |
| 3,014,139 | A | * | 12/1961 | Shildneck | 310/64 |
| 3,469,126 | A | * | 9/1969 | Wiedemann | 310/54 |
| 3,681,628 | A | * | 8/1972 | Krastchew | 310/54 |
| 3,823,569 | A | * | 7/1974 | Sellmaier et al. | 62/50.7 |
| 4,039,740 | A | * | 8/1977 | Iwata | 174/15.5 |
| 4,921,041 | A | * | 5/1990 | Akachi | 165/104.29 |
| 6,288,460 | B1 | * | 9/2001 | Fakult et al. | 310/52 |
| 6,730,851 | B2 | * | 5/2004 | Ladie' et al. | 174/125.1 |
| 6,734,588 | B2 | * | 5/2004 | Leonov | 310/71 |

FOREIGN PATENT DOCUMENTS

| DE | 19742255 C | * | 11/1998 |
| DE | 19749108 C | * | 4/1999 |
| EP | 0967708 A | * | 12/1999 |

* cited by examiner

Primary Examiner—Joseph Waks
(74) Attorney, Agent, or Firm—Frank H. Foster; Kremblas, Foster, Phillips & Pollick

(57) ABSTRACT

A cooled stator for an electric machine including a rotating rotor wherein the stator comprises an electric sheet metal stack and one or more flexible, deformable cooling channels for guiding the flowing cooling medium in a liquid or gas form, reacting with the stacks. The one or more cooling channels being formed from one or more flexible corrugated hoses made of metal.

11 Claims, 4 Drawing Sheets

COOLING OF STATOR BY CORRUGATED HOSE IN AN ELECTRIC MACHINE

BACKGROUND OF THE INVENTION

1. Field of the Invention

The invention relates to a cooled stator for an electric machine with a rotating rotor or for an electric linear motor. The stator is in each case formed with a magnetic laminated core and comprises one or more flexibly deformable cooling channels, which act on the laminated core, for flowing cooling medium.

2. Description of the Related Art

DE 197 42 255 C1 discloses a housing-free three-phase machine with paraxial coolant tubes in the stator laminated core. As the coolant tubes are rigid, difficulties may arise when they are inserted in bores in the stator laminated core, in particular when there are bent paths. It is especially necessary to assemble the cooling channels in sectionalised and complex fashion from different tube portions with deflection bends, corner connection bends and similar.

A cooling jacket with a through-flow of liquid for an electric machine is known from the patent publication EP 0 829 946 A1. A tight-fitting, hose-shaped structure, which is flexible and elastic and consists of rubber or silicone, is proposed as the cooling jacket. This cooling "bag"/hose is not only flexible, but can also be extended considerably. This cooling jacket can therefore sit closely against surfaces of stator laminated cores of the most varied forms. Since, however, according to the known proposal, the cooling jacket is extensible and compressible in all directions, it is difficult to introduce this into narrow, paraxial or radial bores of a laminated core. This means that it is also problematic to assemble the cooling device in the stator laminated core in this case.

"DEPANET—Bibliographische Daten" ("Bibliographical data") discloses a brief abstract of a Chinese patent application CN 1 264 207 according to which corrugated tubes can be inserted in the cooling device of an electric motor. However this source reference fails to reveal a more precise structure or constructional details on the arrangement of the corrugated tube.

The object of the invention is to provide a cooled stator which allows the cooling device to be rapidly and easily assembled.

BRIEF SUMMARY OF THE INVENTION

In order to solve this object with regard to a stator having the features initially mentioned, the invention proposes that the one or a plurality of cooling channel(s) be formed with one or a plurality of flexible corrugated metal hose. These flexible fluid lines, which are known per se (cf. "Handbuch der Metallschläuche" ("Metal hose handbook"), Labhard-Verlag Konstanz 1 999/Witzenmann GmbH, Pforzheim) are distinguished by the fact that they essentially only permit movements or bends transversely to the longitudinal direction, yet cannot be compressed or accommodate movements in the longitudinal direction. The use of corrugated tubes or hose of this kind in electrical machine construction is already known from the European patent specification EP 0 035 071 B1, although only in connection with a water-cooled rotor, and in this case as a flexible intermediate member between a connecting fitting on the overhang side and a water distributing chamber.

The invention makes advantageous use of the axial rigidity of corrugated hose or tubes when assembling the cooling means in the stator to enable these to be rapidly inserted in recesses, slots or bores of the stator laminated core. On account of the flexibility, the corrugated hose can rapidly adapt to the most varied cooling channel paths. The axial rigidity enables them to be easily passed through the cooling bores in the stator laminated core and inserted. A further advantage which is obtained with the invention lies in the fact that, because the inner wall of the corrugated hose has multiple corrugations, turbulence of the cooling medium flowing therein is increased, which in turn increases the heat exchange and the heat elimination.

According to a special formation of the invention, winding slots which are provided at the stator laminated core are utilised as guide receptacles for the corrugated hose. This measure provides the advantage of the corrugated hose or the fluid flowing through them (cooling liquid or air) cooling not just the magnetic or dynamo lamination of the stator, but also the conducting windings or conductors thereof.

On account of their flexibility, the corrugated hose can be guided around corners, edges, front sides or similar of the stator and tightened at their ends. This results in an advantageous formation of the invention according to which the corrugated hose can be laid in the laminated core of the stator under tensile stress, which on the one hand increases the mechanical strength and unity of the stator and on the other augments contact between the cooling corrugated hose and the stator parts.

It is expedient to use a corrugated hose of a thermally stable, flexible material which is a good conductor of heat, with small bending radii also being possible. A corrugated hose consisting of special steel proves to be particularly suitable.

It is expedient to lay the corrugated hose in bores in the laminated core which are provided for the cooling channels in order to increase the heat transfer efficiency between the cooling channel and the stator laminated core. According to an advantageous formation of the invention, the bores which are required to draw in the corrugated hose may be filled with materials which are good conductors of heat (e.g. aluminium, soldering tin, etc.) in order to further increase thermal conductivity. Zinc, lead or a plastics material may also be used as casting materials on account of their good heat-conductive properties.

Casting with a heat-conductive material is also suitable for corrugated hose which are laid in winding slots. If, however, direct contact between the corrugated hose and the winding is to be avoided, e.g. for reasons of safety and reliability, it is more expedient to lay the hose in the bores. The corrugated hose may also have greater diameters in such a case. The bores for the corrugated hose may extend axially, paraxially, radially and, in principle, at any conceivable angle to the centre axis or rotational axis and with any bend corresponding to the smallest possible bending radius of the corrugated hose.

The use of the stator cooling device according to the invention both with electric linear motors and with all known, electric rotary motors of different designs is possible within the scope of the general inventive concept. Air, water and all other media which are known for cooling purposes are suitable as cooling medium. The use according to the invention of the corrugated hose always leads to very good assembly possibilities and a resulting significant saving of time. The corrugated hose end of the stator cooling system can be connected to external cooling fluid circuits and supply devices by means of connecting elements which are known per se, such as plug-in nipples, hose coupling, adapters and the like.

A contributory factor in this respect lies in an advantageous formation of the invention according to which—in the case of electric rotary motors—the corrugated hose are laid and/or bent in the region of stator front sides or any end shields which are to be attached such that meander-like windings are produced. The curve formation, which is linked with this, for the cooling medium flow path promotes the above-mentioned turbulence. In the case of electric linear motors a formation of the invention in which a plurality of corrugated hose or corrugated hose portions extending parallel and transversely to the stator longitudinal direction are connected together by bent portions corresponds to this.

BRIEF DESCRIPTION OF THE SEVERAL VIEWS OF THE DRAWINGS

Further details, features, advantages and effects based on the invention will emerge from the following description of preferred ways of implementing the invention and from the drawings, in which.

DETAILED DESCRIPTION OF THE INVENTION

Figure 1:
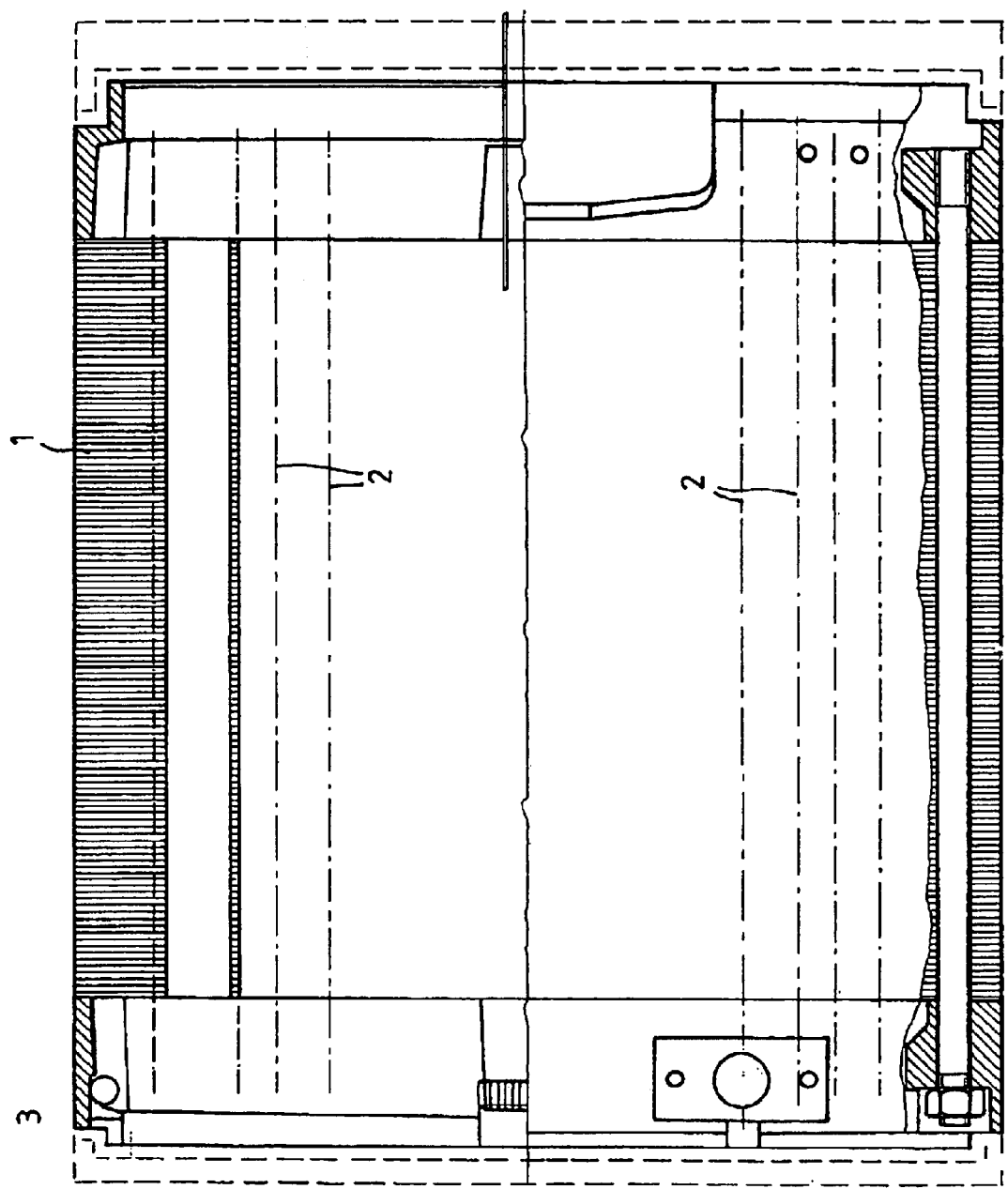
FIG. 1 shows a stator according to the invention in longitudinal section with corrugated hose indicated by dot-dash lines as cooling channels.

The stator which is represented in FIG. 1 is constructed with a magnetic laminated core 1 and is penetrated by paraxial portions 2 (indicated by dot-dash lines) of the cooling channels which are implemented by means of a corrugated tube 3. In the illustrated example according to FIGS. 1–3 a single or one-piece corrugated tube 3 is used to form the cooling channels. It is of course also possible, without departing from the scope of the invention, for the cooling channels or the cooling channel system of the stator to be of multipiece construction with a plurality of corrugated hose.

Figure 2:
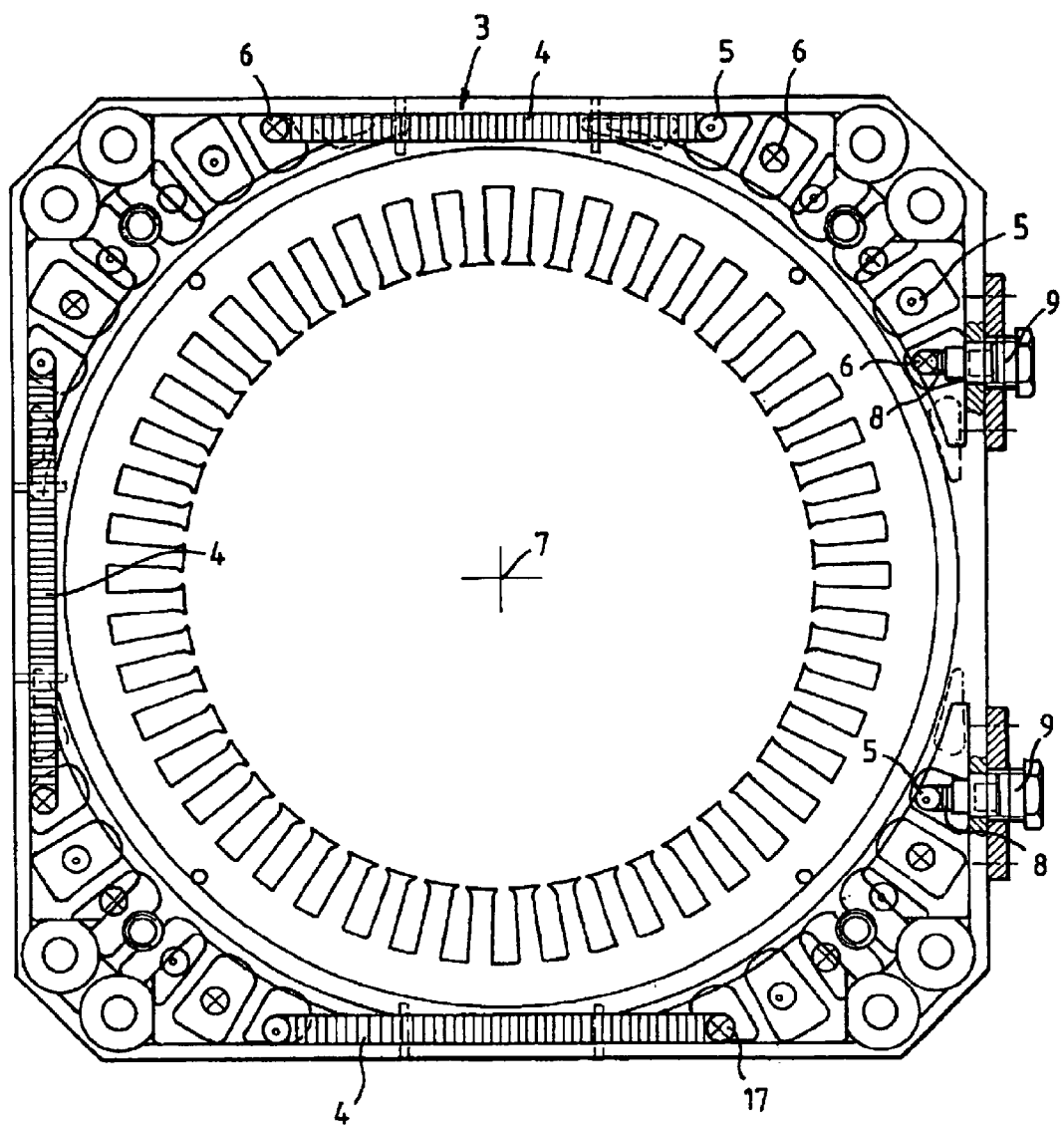
FIG. 2 is a first front view onto the stator according to FIG. 1.
Figure 3:
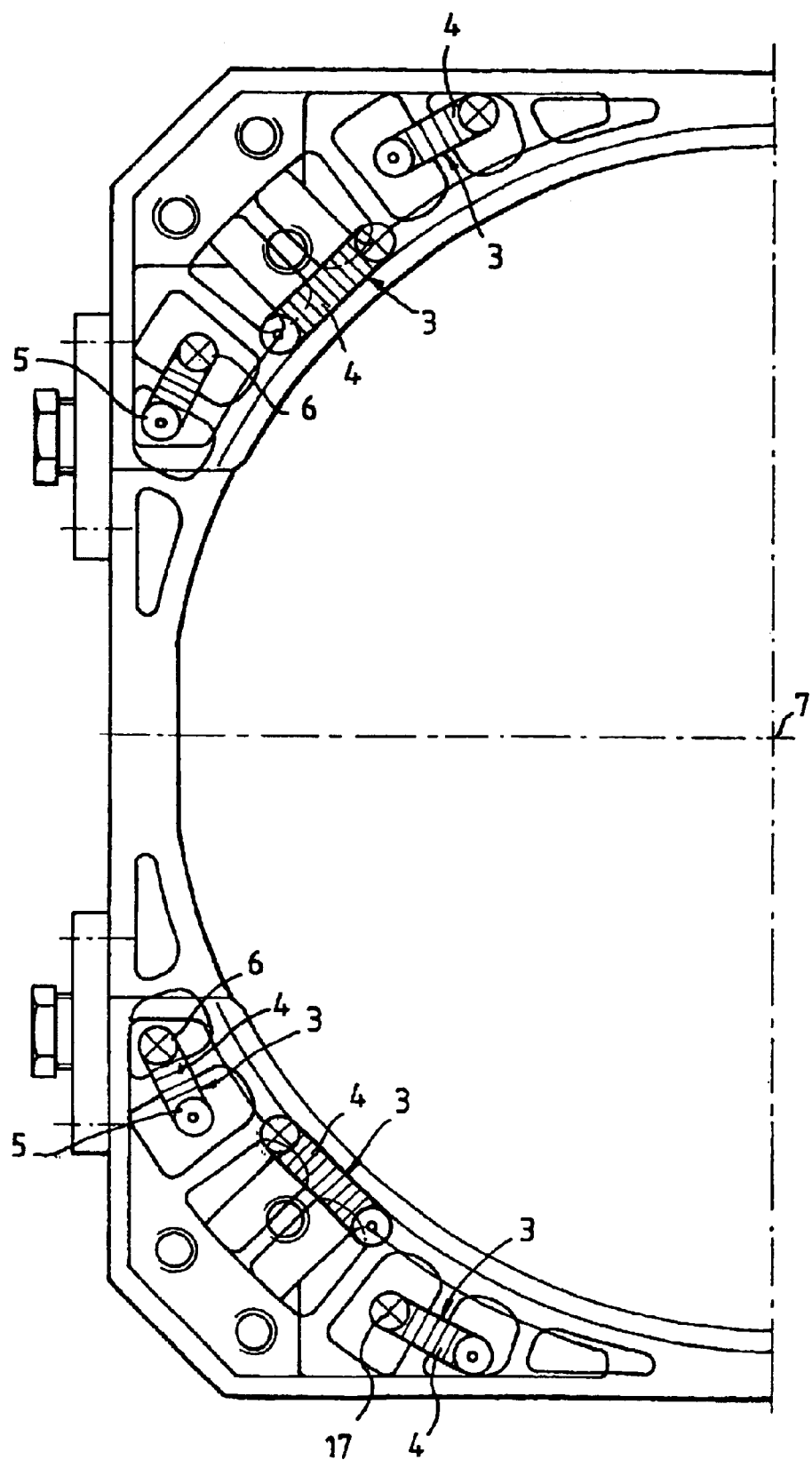
FIG. 3 is a second, partial front view onto the stator according to FIG. 1.

According to FIGS. 2 and 3, the corrugated hose is bent over through 180° at different entry and exit points 6, 5 at the respective front sides of the stator, so that corrugated hose deflection bends 4 are produced at the front sides. The deflection is illustrated by respective exit points 5 leading out of the plane of the drawing and entry points 6 entering the plane of the drawing. As a result, the corrugated hose 3 follows a meandering path which continues in the circumferential direction of the stator around the rotational axis 7 and which augments the turbulence of the cooling medium flowing in the corrugated hose 3.

According to FIG. 2, short transverse portions 8 of the corrugated hose 3 form the two hose ends and in each case open into a connection screw part 9 for the feed and discharge of cooling medium.

Figure 4:
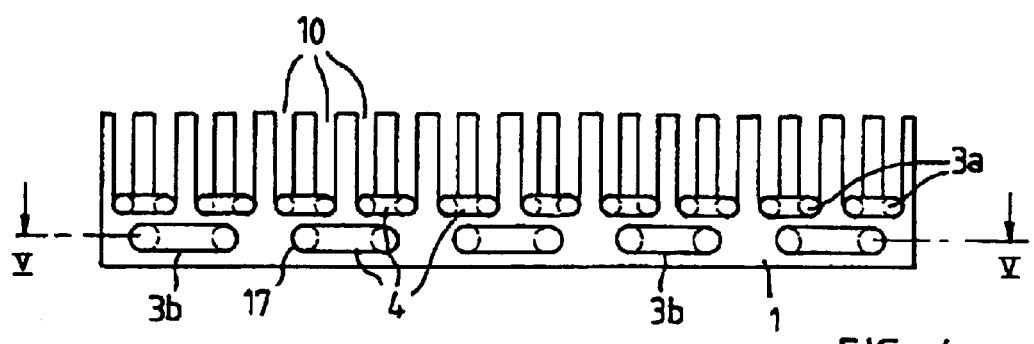
FIG. 4 is a diagrammatic longitudinal view onto the stator of a linear motor.
Figure 5:
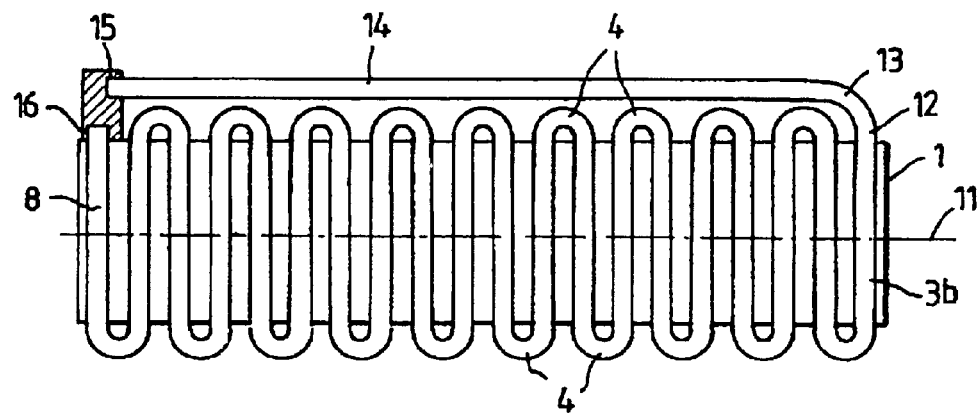
FIG. 5 is a sectional representation according to V—V in FIG. 4.

In FIGS. 4 and 5 an electric linear motor of single-comb construction is cooled by means of two separate corrugated hose 3a, 3b. The first corrugated hose 3a is laid directly in the winding slots 10 and extends via deflection bends 4 in each case to the next winding slot 10. Similarly to the embodiment according to FIGS. 1–3, the second corrugated hose 3b extends directly in bores 17 of the laminated core 1, this taking place in meandering fashion via uniform turns in the direction of the stator longitudinal axis 11. The meander turns are again formed by means of a plurality of deflection bends 4, which in the embodiment according to FIGS. 4 and 5 emerge along the stator longitudinal axis 11 one behind the other in alternating fashion with respect to the two longitudinal axes of the laminated core 1. The last exit point 12 is connected via a return bend 13 and a linear longitudinal portion 14 of the corrugated hose 3b to a connection adapter 15, from which the beginning 16 of the corrugated hose also extends. The first-mentioned corrugated hose 3a of the linear motor may also be coupled by way of its inlet and outlet end to the connection adapter 15, in which case the two corrugated hose 3a, 3b may be connected in parallel to the same cooling medium source, for example.

It is expedient—both in the case of the stator for the rotary motor according to FIGS. 1–3 and for the electric linear motor according to FIGS. 4 and 5—to fill any interspaces between the corrugated hose 3, 3a laid in the laminated core 1 and the actual laminated core inside the bore by means of a heat-conductive material.

List of Reference Characters 1 laminated core
2 paraxial portion
3,3a,3b corrugated hose
4 deflection bends
5 exit point
6 entry point
7 rotational axis
8 transverse portion
9 connection screw part
10 winding slot
11 longitudinal axis of stator
12 last exit point
13 return bend
14 longitudinal portion
15 connection adapter
16 beginning of corrugated hose
17 bore

What is claimed is:

1. An improved cooled stator for an electric machine with a rotating rotor, which stator is formed with a magnetic laminated core and comprises at least one flexibly deformable cooling channel, which acts on the laminated core, for flowing cooling medium in a fluid state, wherein the improvement comprises the cooling channel formed with at least one flexible corrugated metal hose.

2. An improved cooled stator for an electric linear motor which is formed with a magnetic laminated core and comprises at least one flexibly deformable cooling channel, which acts on the laminated core, for flowing cooling medium, wherein the improvement comprises the cooling channel formed with at least one flexible corrugated metal hose.

3. A stator according to claim 1 or 2, wherein winding slots are provided at the stator laminated core, wherein the corrugated hose is in the winding slots and is in contact with electrically conducting winding parts.

4. A stator according to claim 3 wherein the corrugated hose is in the laminated core under tensile stress.

5. A stator according to claim 3 wherein at least one bore is formed in the laminated core to form the cooling channel, wherein the corrugated hose is in the bore.

6. A stator according to claim 3 wherein the corrugated hose is secured to the laminated core by a casting with a heat-conductive material.

7. A stator according to claim 6, wherein the casting is a plastics material, selected from the group consisting of aluminium, tin, lead, zinc, an alloy with aluminium and an alloy with zinc.

8. A stator according to claim 3 wherein at least a portion of the corrugated hose is parallel to a rotational axis.

9. A stator according to claim 8, wherein the corrugated hose is in the region of stator shields which are attached in order to form windings extending in meander-like fashion.

10. A stator according to claim 3 wherein a corrugated hose extends parallel and transversely to a stator longitudinal direction.

11. A stator according to claim 10, wherein a single corrugated hose extends in a meander-like path and has transverse portions connected together by bent portions.

* * * * *